US007201365B2

(12) United States Patent
Crawford

(10) Patent No.: US 7,201,365 B2
(45) Date of Patent: Apr. 10, 2007

(54) APPARATUS AND A METHOD FOR USE IN HANDLING A LOAD

(75) Inventor: Alexander Charles Crawford, Newport-on-Tay (GB)

(73) Assignee: Deep Tek Limited, Newport-on-Tay (GB)

( * ) Notice: Subject to any disclaimer, the term of this patent is extended or adjusted under 35 U.S.C. 154(b) by 126 days.

(21) Appl. No.: 10/531,105

(22) PCT Filed: Oct. 7, 2003

(86) PCT No.: PCT/GB03/04317
§ 371 (c)(1),
(2), (4) Date: Apr. 11, 2005

(87) PCT Pub. No.: WO2004/035454

PCT Pub. Date: Apr. 29, 2004

(65) Prior Publication Data

US 2006/0151763 A1 Jul. 13, 2006

(30) Foreign Application Priority Data

Oct. 15, 2002 (GB) ................................ 0223964.8

(51) Int. Cl.
*H02G 11/02* (2006.01)

(52) U.S. Cl. ................. 254/284; 114/254; 191/12.2 A; 242/406

(58) Field of Classification Search ................ 254/278, 254/283, 284, 287, 288, 290, 332, 334; 191/12 R, 191/12.2 A, 12.4; 212/271, 279, 238, 240, 212/243, 251, 332; 242/439, 439.4, 441, 242/441.2, 406; 294/65.5, 64.1; 414/918
See application file for complete search history.

(56) References Cited

U.S. PATENT DOCUMENTS 2,030,128 A * 2/1936 Webster ..................... 294/81.6
3,973,656 A * 8/1976 Zumbro .................... 191/12 R
4,659,276 A * 4/1987 Billett ........................ 414/543
5,044,826 A * 9/1991 Forster ....................... 405/169
5,240,092 A * 8/1993 Eachus ..................... 191/12 R (Continued)

FOREIGN PATENT DOCUMENTS

DE 19820037 11/1999

(Continued)

*Primary Examiner*—Emmanuel M Marcelo
(74) *Attorney, Agent, or Firm*—Drinker Biddle & Reath LLP

(57) ABSTRACT

Apparatus for use in handling a load where a load-bearing rope and a service cable are inter-wound as they are being paid out, having a wrapping device for wrapping a securing member around the service cable and the load-bearing rope, and to unwrap the securing member from the service cable and load-bearing rope as either of them is recovered. The securing member is wound around the service cable and the hoist rope, to hold the service cable relative to the load-bearing rope and to reduce the extent of creeping of the service cable down the load-bearing rope. The securing member can be planar, in the form of a strip, tape or ribbon, or can have a circular cross-section, in the form of a rope. In preferred embodiments, the securing member is resilient and is applied to the rope in tension.

21 Claims, 7 Drawing Sheets

U.S. PATENT DOCUMENTS

| | | | | |
|---|---|---|---|---|
| 5,727,373 | A * | 3/1998 | Appleford et al. | 57/1 UN |
| 6,267,356 | B1 * | 7/2001 | Crawford | 254/266 |
| 6,698,722 | B1 * | 3/2004 | Crawford | 254/284 |
| 6,712,336 | B1 * | 3/2004 | Crawford | 254/266 |
| 6,752,384 | B2 * | 6/2004 | Matheson | 254/266 |

FOREIGN PATENT DOCUMENTS

| | | |
|---|---|---|
| WO | WO0056654 | 9/2000 |
| WO | WO0160732 | 8/2001 |

* cited by examiner

APPARATUS AND A METHOD FOR USE IN HANDLING A LOAD

This Application is the U.S. National Phase Application of PCT International Application No. PCT/GB03/004317 filed Oct. 7, 2003.

This invention relates to apparatus for use in handling a load which is capable of raising and lowering, or of towing, a load and also handling service cables and/or hoses connected to the load. The invention is particularly, but not exclusively, applicable to the handling of subsea equipment such as grabs.

DESCRIPTION OF THE RELATED ART

Providing services to underwater equipment often involves the provision of a specific bundle of cable(s) and/or hose(s) dedicated to each application. For some applications, it is known to incorporate the service bundle within an armoured hoist rope. This approach has a number of deficiencies. The resulting rope is costly, gives inferior hoisting properties, and by virtue of limitations on the diameter of rope which can be handled, the services that can be incorporated are limited. Further, in practice it is impossible with this arrangement to add to the length of the rope or to join different types of materials, for example wire ropes with fibre ropes.

To avoid the necessity of using the expensive armoured hoist rope, it is known to wind a service cable around a rope, or vice versa, to service underwater equipment. However, due to water currents and/or movement of a ship from which the apparatus operates, the service cable and rope are placed under stress, which can cause the service cables and the rope to pull away from each other, and the service cable to slip or creep down the rope.

BRIEF SUMMARY OF THE INVENTION

According to an aspect of the present invention there is provided apparatus for use in handling a load comprising a load-bearing rope, a mechanism for paying out and recovering the load-bearing rope, a service cable and a service cable holder for holding the service cable, a first wrapping device for rotating one of the service cable and the load-bearing rope around the other as they are payed out to wrap the two together, and to unwrap them from one another as they are recovered, a mechanism for holding and paying out a securing member, and a second wrapping device for wrapping the securing member around the service cable and the load-bearing rope, and to unwrap the securing member from the service cable and load-bearing rope as either of them is recovered.

The securing member is wound around the service cable and the hoist rope, to hold the service cable relative to the load-bearing rope and to reduce the extent of creeping of the service cable down the load-bearing rope.

The securing member can be planar, in the form of a strip, tape or ribbon, or can have a circular cross-section, in the form of a rope. In preferred embodiments, the securing member is resilient and is applied to the rope in tension.

The term "service cable" is used herein to denote a flexible elongate member used for conveying power or data, such as an electrical cable, a fibre optic cable, or a pneumatic or hydraulic hose. Typically, the first wrapping device comprises a service cable drum being arranged for rotation about a drum axis which coincides with the axis of the rope. The cable may be guided by sheaves or pulleys from the drum.

Instead of rotating on its axis, cable drum may be static and may have a winding device rotating around it to pay out the service cable. Preferably, the service cable drum has a central aperture through which the load-bearing rope passes.

The service cable drum may be rotatably mounted on a structural member so that its axis is not co-incident with the axis of the rope, and so that it is moved in a circular path around the axis of the rope as the cable is being paid out or recovered.

Sheaves and/or pulleys may again guide the cable as it is being paid out or recovered. The axis of the service cable drum in such embodiments can be vertical so that it is parallel to the axis of the rope, or horizontal, so that it is perpendicular to the axis of the rope.

Optionally, the cable drum has an axis which coincides with the axis of the load-bearing rope, the cable drum typically having a central aperture through which the load-bearing rope passes, with the service cable passing over a cable sheave which is mounted for movement in a circular path around the axis of the load-bearing rope.

Optionally, the securing member drum has an axis which coincides with the axis of the load-bearing rope, the securing member drum typically having a central aperture through which the load-bearing rope passes, the securing member passing over a rope sheave which is mounted for movement in a circular path around the axis of the load-bearing rope.

Optionally, the first and second wrapping devices include respective arms arranged for rotation about the load-bearing rope. Optionally, the arms support spooling gear.

Preferably, the securing member leaves the securing member drum and any associated sheaves radially outward of the service cable to wind the securing member around the service cable and the load-bearing rope.

Preferably, the securing member has elastic properties. Typically, the securing member is made of neoprene with a nylon reinforcing strip or sheath. The securing member can have a nylon reinforcing strip woven into it to limit the maximum extension of the member, or can be sheathed in nylon. The securing member may be planar, and may incorporate an adhesive to hold the securing member to the rope.

Typically, the mechanism for paying out and recovering the load-bearing rope includes a rope winch, from which the load-bearing rope passes over a rope sheave and thereafter extends to the load along a substantially straight axis.

Optionally, the rope winch, the cable drum, the securing member drum, and any winding devices each have a respective driving motor. Alternatively, the rope winch, the cable drum, the securing member drum and any winding devices are driven by a single source through appropriate mechanical linkages.

Typically, the service cable and/or the securing member are payed out close to the axis of the rope.

Typically, the service cable comprises an electrical cable, a fibre optic cable, a pneumatic cable or a hydraulic hose.

Preferably, the load-bearing rope is a hoist rope used for raising and lowering a load. Typically, the load-bearing rope is a towing rope used for paying out, towing and recovering a load.

Optionally, more than one service cable is provided, each typically extending from a respective drum.

Optionally, the cable drum and the securing member drum are both coaxial with the load-bearing rope, one being positioned above the other and the load-bearing rope extending through the centre. Alternatively, one of the cable drum and the securing member drum is coaxial with the load-bearing rope and the other is arranged for movement in a circular path around the rope on a winder mechanism. Alternatively, neither the cable drum nor the securing member drum is coaxial with the load-bearing rope and both are moved in a circular path around the rope on winder mechanisms. In any of these cases, the axes of the cable and securing member drums can be either parallel to or perpendicular to the axis of the hoist rope.

Preferably, the apparatus also includes a guide means for guiding the load-bearing rope.

Typically, the guide means comprises at least one roller or sheave. Preferably, more than one roller is provided. Optionally, four rollers are provided around the circumference of the rope forming a roller cage which encloses the load-bearing rope.

According to a second aspect of the present invention there is provided a method for use in handling a load, comprising:

paying out a load-bearing rope;

paying out a service cable;

wrapping one of the rope and the service cable around the other as they are being paid out;

wrapping a securing member around the service cable and load-bearing rope as they are being paid out;

and subsequently unwrapping the securing member and service cable from the load-bearing rope as the load-bearing rope is recovered.

Preferably, the securing member is wound around the load-bearing rope in the opposite direction to the service cable, typically over the top of the service cable.

Winding the service cable and the securing member in opposite directions could more strongly fix the service cable to the load-bearing rope.

Optionally, the securing member is wrapped around the rope and service cable(s) only at intervals along the rope, but in most embodiments the securing member is wrapped continuously down the length of the rope as it is payed out. Such intermittent wrappings can comprise discrete lengths of rope, tape or ribbon, optionally formed of elastic material and optionally with an adhesive element, in order to avoid the need to wrap the securing member continuously around the rope and cable. In some embodiments, the tape can be applied intermittently on top of the securing member, so that there are several layers of securing member at certain points on the rope, for example at the lower end of the rope that will be at the deepest depths. Typically the tape is applied at intervals eg every 100–300 meters.

BRIEF DESCRIPTION OF THE SEVERAL VIEWS OF THE DRAWINGS

Examples of apparatus and a method for use in handling a load in accordance with the invention will now be described with reference to the drawings, in which.

DETAILED DESCRIPTION OF THE INVENTION

Figure 1:
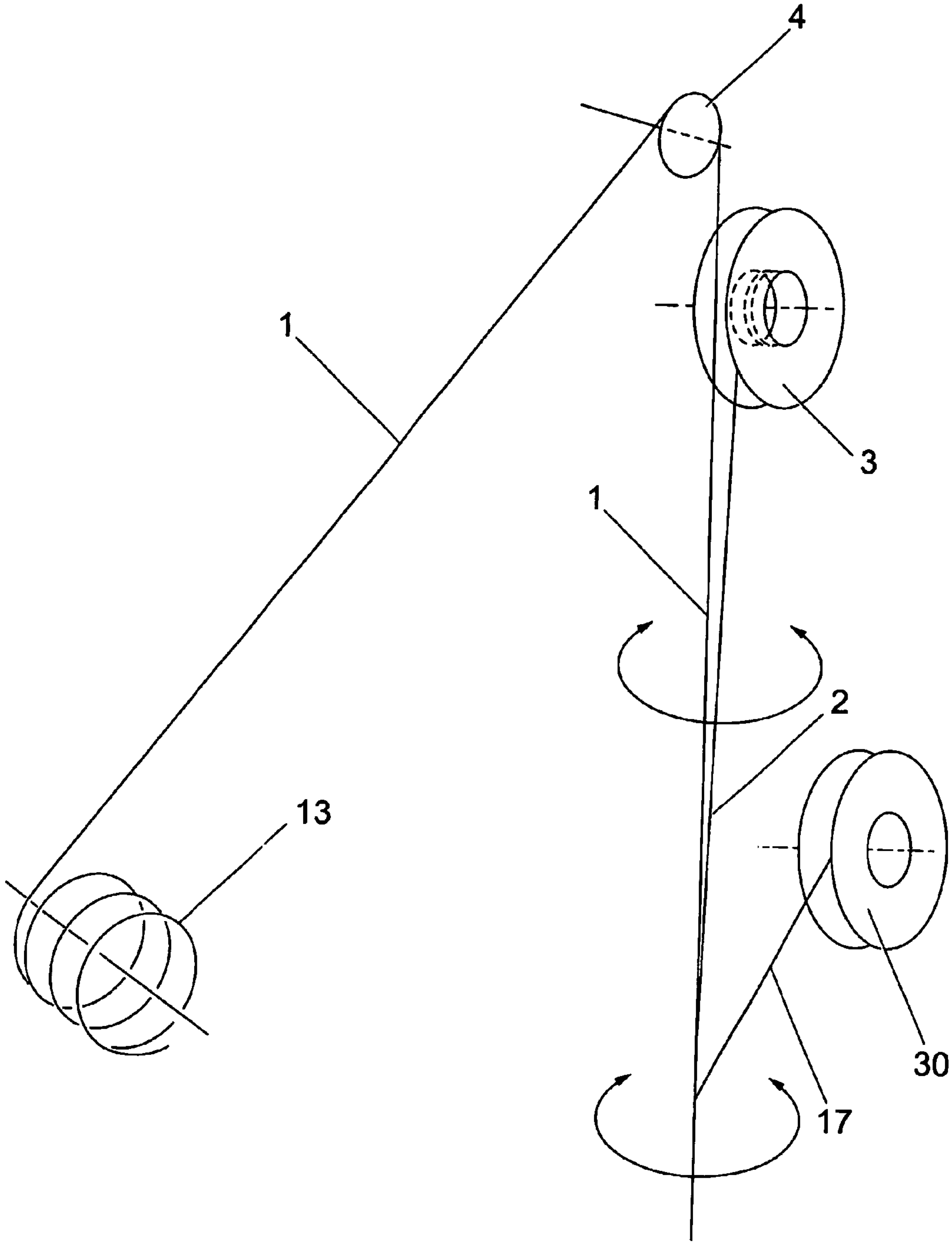
FIG. 1 is a schematic perspective view illustrating the principle of operation of a first example of the invention.

Referring to FIG. 1, a hoist rope 1 extends from a hoist rope winch 13 over a hoist rope sheave 4 to support a load (not shown) for raising and lowering. The hoist rope 1 may be any suitable form of hoist rope such as flexible steel wire rope or synthetic fibre rope, for example of "Kevlar". A service cable 2 is held on a service cable drum 3, which is rotatably mounted around the rope 1. One end of the cable 2 extends from the drum 3 and is wound around the rope 1. A securing member in the form of a planar strip 17 of elastic material such as neoprene is held on a rope drum 30, which is also rotatably mounted for movement in a circular path around the rope 1. An end of the strip 17 extends from the rope drum 30 and is wound around the entwined rope and service cable 2, preferably at a different pitch or in a different direction. The drums 3, 30 are preferably rotatable independently of each other, but they could be rotatable together. Additional service cables could be wound around the hoist rope 1 from additional respective drums rotatably mounted around the hoist rope 1. The securing member drum 30 should be mounted to wrap the strip 17 around the only or outer service cable 2 (i.e. on an arm which extends outward of the service cable drum(s)).

Figure 2:
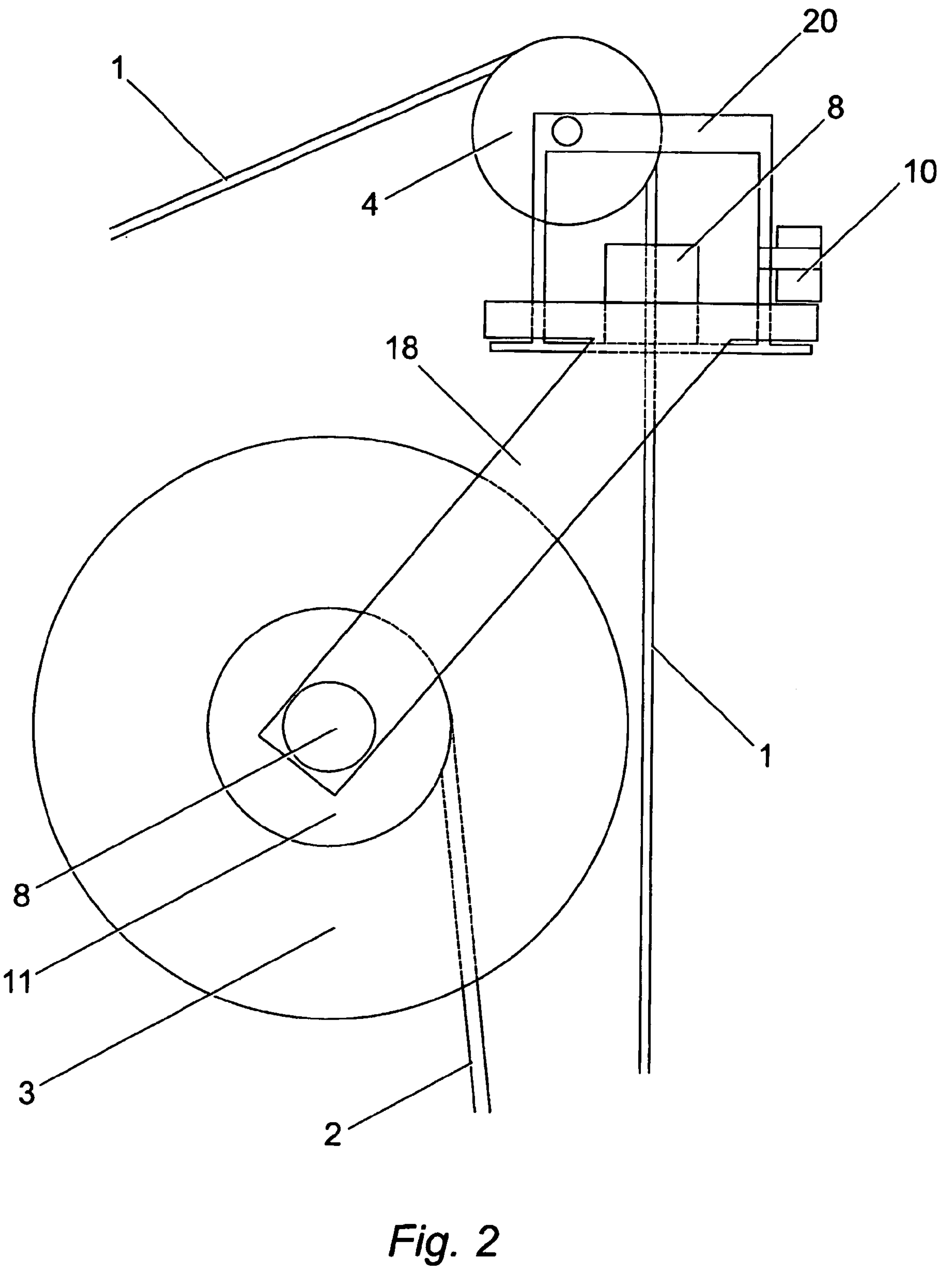
FIG. 2 is a side view showing details of a part of the apparatus of FIG. 1.

The strip 17 is preferably elastic, but this is not essential. Certain preferred forms of securing member such as the strip 17 can also be tacky or adhesive FIG. 2 shows a more detailed view of the connection of the cable drum 3 with the rest of the apparatus. The service cable drum 3 is removably mounted on a hub motor 11 which is carried on the end of an arm 18 rotatably mounted on a fixed frame 20 and driven by a motor 10. The frame 20 is attached to the rope sheave 4.

Figure 3:
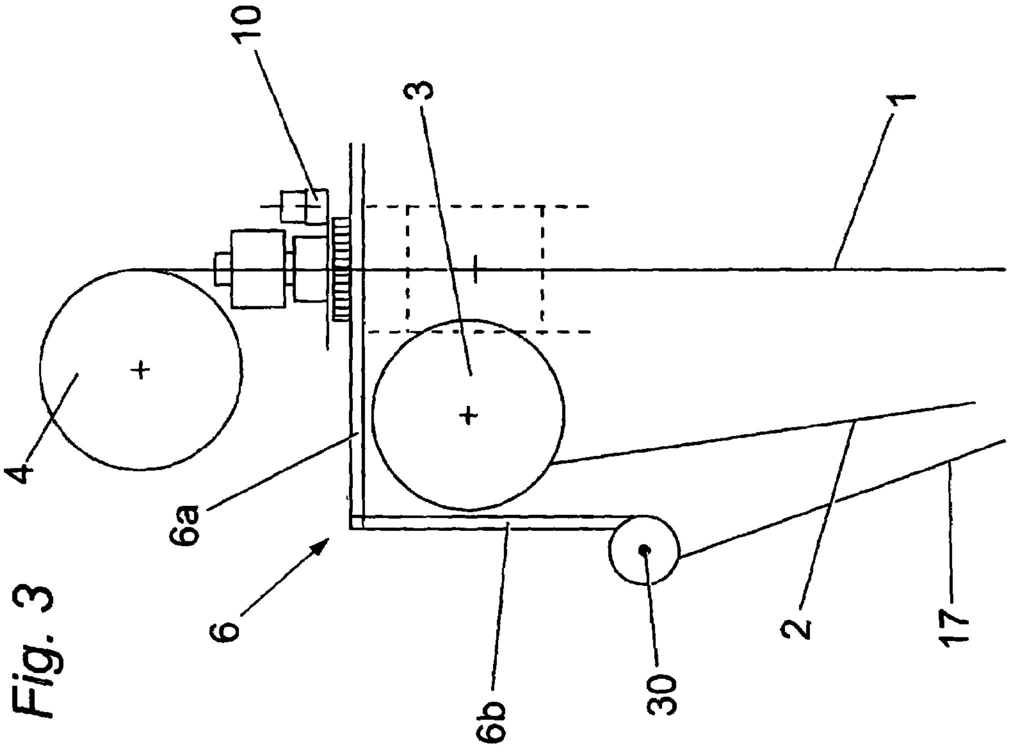
FIG. 3 is a cross-section view of an embodiment of FIG. 1.

FIG. 3 is also a more detailed version of FIG. 1, also showing the strip drum 30. The strip drum 30 is attached to the end of an L-shaped arm 6. The arm 6 has a horizontal limb **6*a* extending radially from the axis of the apparatus to a point outward of the cable drum 3 and a vertical limb 6*b* on the end of which the strip drum 30 is located, to suspend the strip drum 30 radially outward and below the cable drum 3. This ensures that the securing member 17 is always wound the top of the service cable 2 and that the securing member 17 and the cable 2** do not become entangled.

In use, the winch 13 is rotated to lower the hoist rope 1. At the same time, the motor 10 is activated to rotate the arm 18 around the hoist rope 1, and the arm 6 is also rotated (typically by its own similar motor arrangement, or it may be powered from the motor 10). The arm 6 is typically rotated in the opposite direction to the arm 18, which rotates the cable drum 3 and the strip drum 30 around the hoist rope 1, to wind the strip 17 around the hoist rope 1 in the opposite direction to the winding of the service cable 2. The service cable 2 is thus entwined around the hoist rope 1 which is attached to a load, and the strip 17 is wound around the entwined hoist rope 1 and cable 2. Thus, the hoist rope 1 can take the strain of an object lifted without placing the service cable 2 under strain, and the strip 17 binds the service cable 2 to the hoist rope 1, preventing it from slipping down the hoist rope 1.

In most preferred embodiments the strip has an elastic component and is applied to the rope in tension, so that once applied the strip keeps the cable close to the rope. The tension applied to the strip by e.g. a self tensioning device on the wrapping mechanism is not generally sufficient to overcome the tension in the main hoist rope, and so does not affect the assembly of the rope, cable and securing member.

To recover the hoist rope 1 and the service cable 2, the procedure is simply reversed. The direction of the motor(s) is reversed to rotate the arms 6, 18 in the opposite directions, to wind the service cable 2 and the securing member 17 back onto their respective drums. If tape has been used, this is unwound or cut (by hand or automatically) from the entwined ropes/cable(s).

Figure 4:
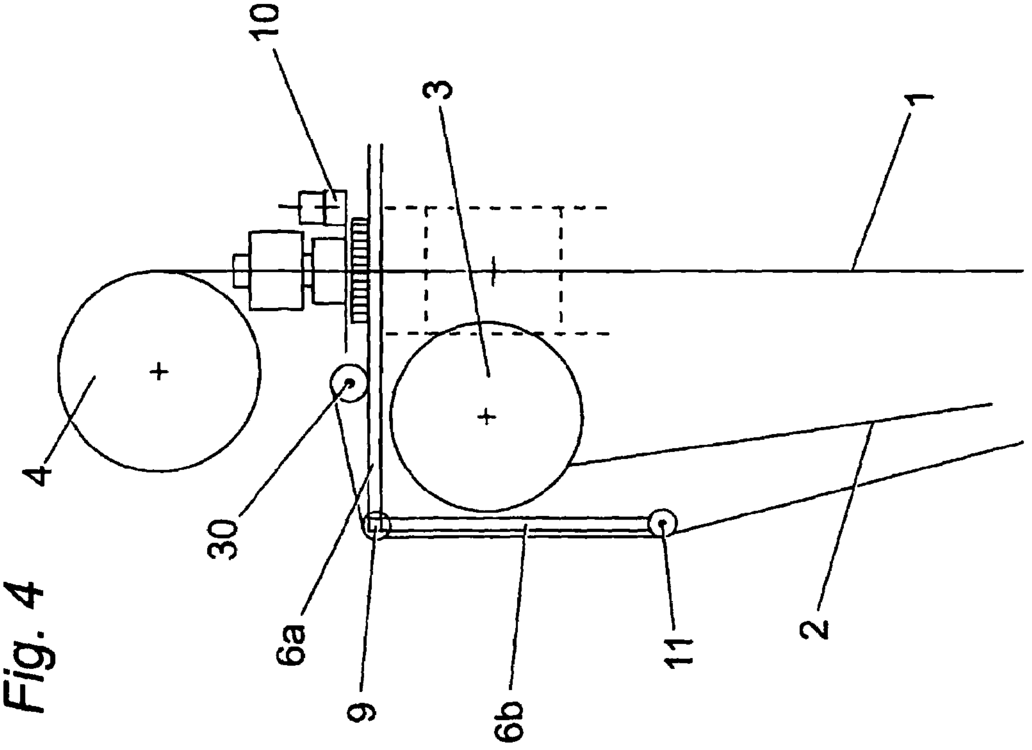
FIG. 4 is a cross-section view of an alternative embodiment of FIG. 1.

FIG. 4 shows an alternative embodiment, where the securing member drum 30 is located on top of the horizontal limb 6*a*. The securing member 17 extends over the limbs 6*a* and 6*b*, guided by guides 9, 11, which are typically sheaves or rollers. The guide 9 is at the apex of the arm 6; guide 11 is on the end of the vertical limb 6*b*. The securing member 17 extends from the guide 9 towards the rope 1 on the exterior of service cable 2, in a similar way to the FIG. 3 embodiment.

Figure 5:
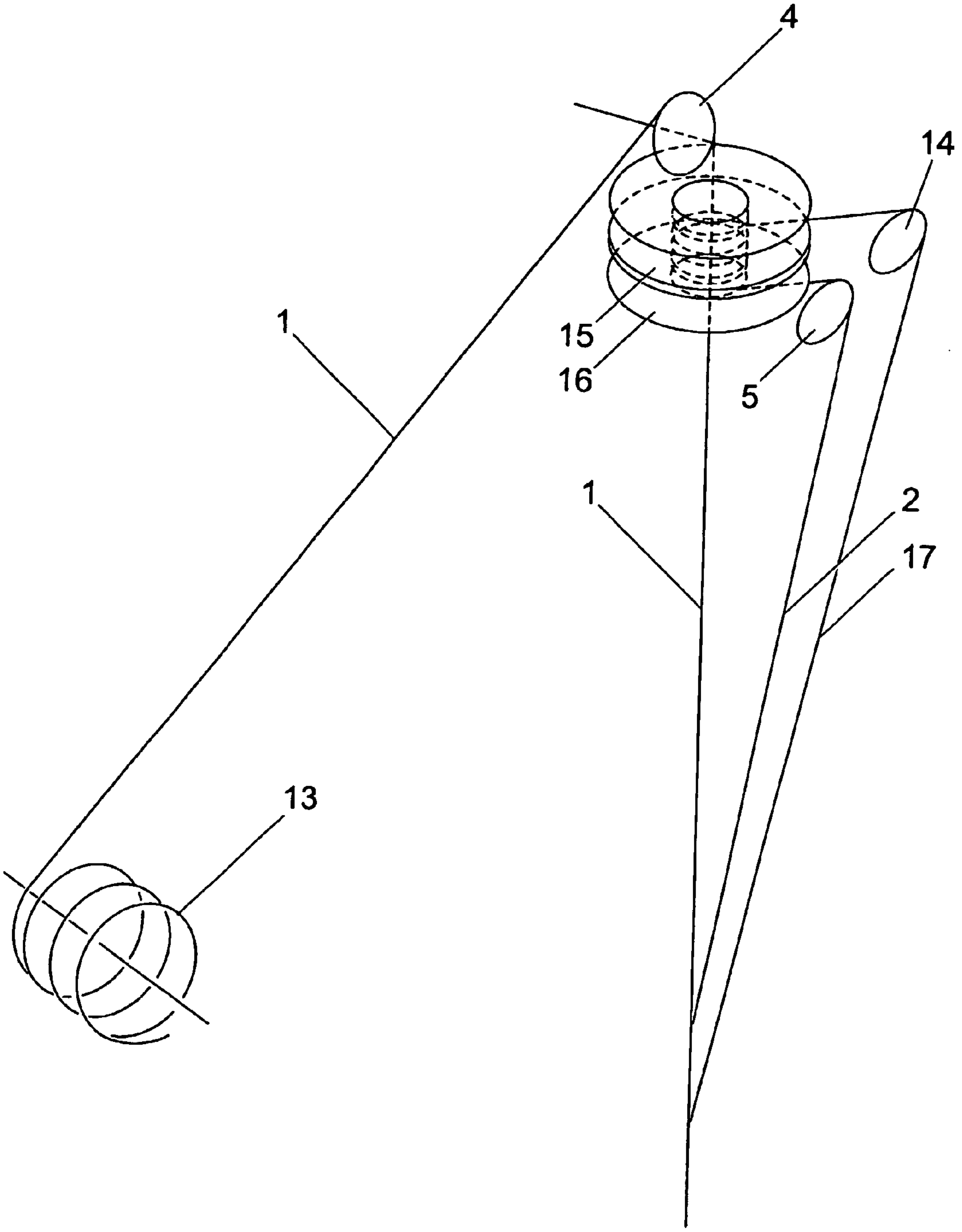
FIG. 5 is a schematic perspective view of a second example of the invention.

FIG. 5 shows a schematic diagram of an alternative embodiment. In this modification, the service cables 2 and the securing member 17 are each provided with a respective storage drum 16, 15 stacked on top of each another with their axes parallel to the axis of the rope 1. The service cable 2 and the securing member 17 each have a respective sheave 5, 14 which may suitably be carried on a common supporting frame for rotation in unison. Alternatively the frames may be separate so that the sheaves 5, 14 can rotate independently of one another. The apparatus may be further modified by adding further drums and sheaves to handle more service cables.

Figure 6:
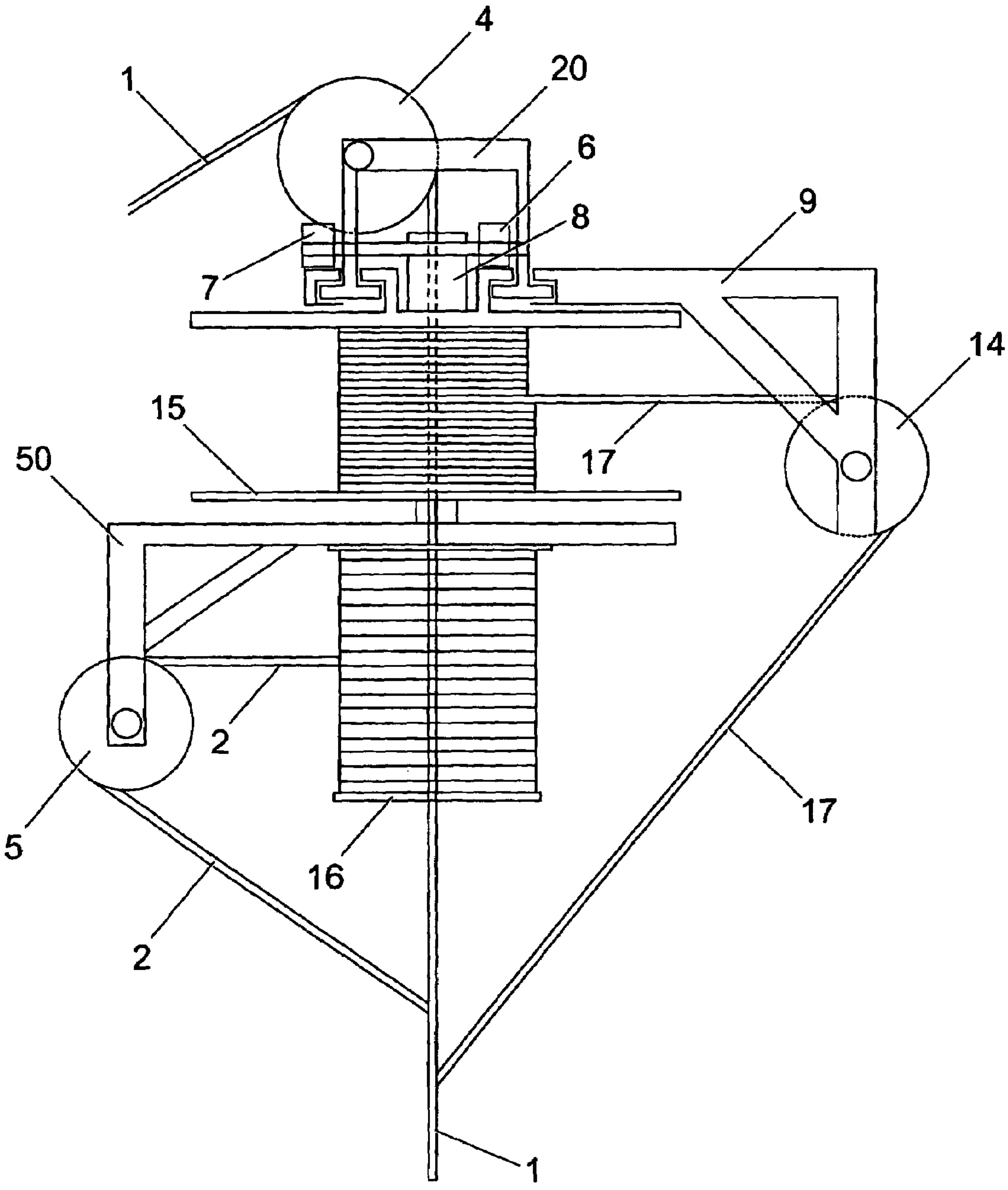
FIG. 6 is a more detailed side view of a part of FIG. 5.

FIG. 6 shows the cable drum 16, the member drum 15 and associated parts in greater detail. The rope sheave 4 is journalled to a fixed frame 20 that is secured to any suitable supporting structure such as an A-frame (not shown). The member drum 15 and the cable drum 16 are rotatably mounted one above the other on the lower part of the frame 20.

The inner end of the service cable 2 can be connected to any appropriate service if needed by any convenient means (not shown) but is otherwise connected to the cable drum 16.

The member drum 15 is driven in rotation by a motor 6. Optionally, a shaft (not shown) passes through the centre of the member drum 15 and the shaft meshes with a cog engagement mechanism inside the bore of the member drum 15 to rotate the member drum 15. The cable drum 16 is could be driven in rotation by a separate motor (not shown); alternatively, the cable drum 16 could be driven in rotation from the motor 6. This could be done from an inner shaft, inside the shaft that drives the member drum 15, connecting inside the bore of the cable drum by a similar engaging cog mechanism. A gear mechanism would preferably be provided to rotate the inner shaft in the opposite direction to the outer shaft.

The member sheave 14 is journalled on a mounting frame 9 that is rotatable about the fixed frame 20 by means of a motor 7. Likewise, the service cable sheave 5 is journalled on a mounting frame 50 that is rotatable about the fixed frame 20. Again, the service cable sheave 5 could be driven in rotation from the same motor 7 via an interior shaft and cogs, or from a separate motor (not shown).

The motors 6 and 7 are driven at speeds related to the axial speed of the hoist rope 1. The speed correlation may be fixed. Preferably, however, this correlation will be controllable to alter both the length of twist (pitch) of the lay of the member 17 on the hoist rope 1, and the tension in the securing member 17. The pitch and the lay of the cable 2 on the hoist rope 1 will also be controlled in a similar way, whether these are controlled by the same motors 6, 7 or different ones not shown.

Figure 8:
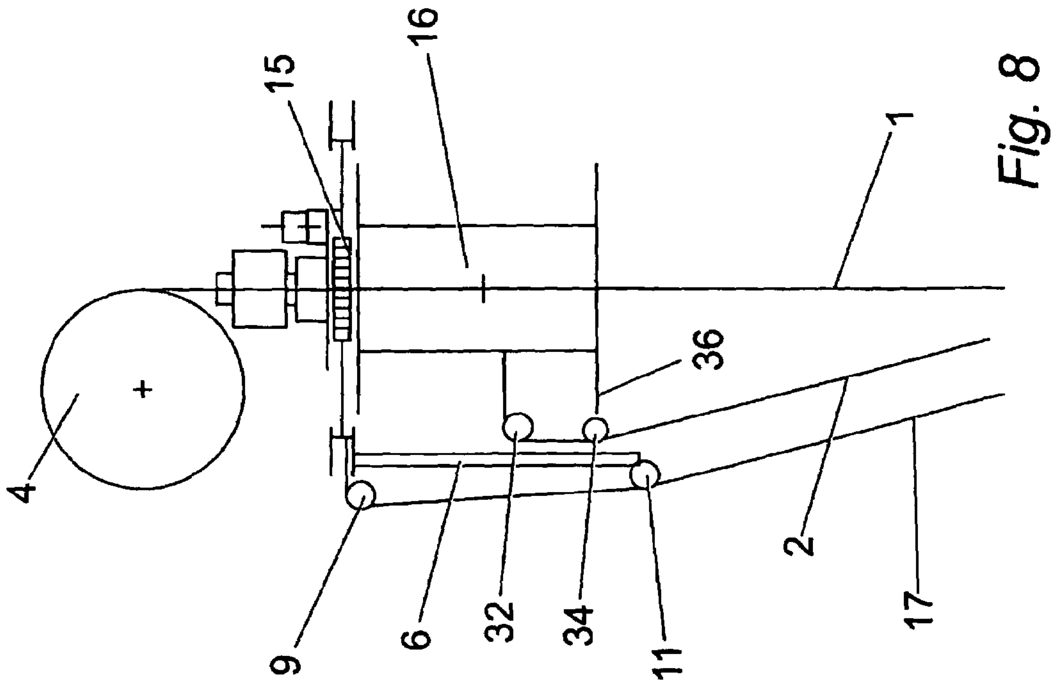
FIG. 8 is a cross-section view of an alternative embodiment of FIG. 5.

FIG. 8 shows a more detailed view of the embodiment of FIG. 5. The service cable 2 extends from the rope drum 16 over guides 32, 34 to pass the service cable 2 around the lower lip 36 of the service cable drum 16 without dragging on the lip 36. The guides 32, 34 are located on an arm (not shown) adapted for rotation around the cable drum 16, as shown in FIG. 6.

Likewise, the securing member 17 extends over a second L-shaped arm 6 (only the vertical portion of the arm is shown) over guides 9, 11. In this embodiment the securing member is in the form of an elasticated rope. The guides 9, 11 are typically rollers or sheaves. The arms are preferably rotatable independently of each other.

After passing over their respective guides, service cable 2 and securing member 17 extend towards the hoist rope 1 to wind around the rope 1, as in the other embodiments.

Figure 7:
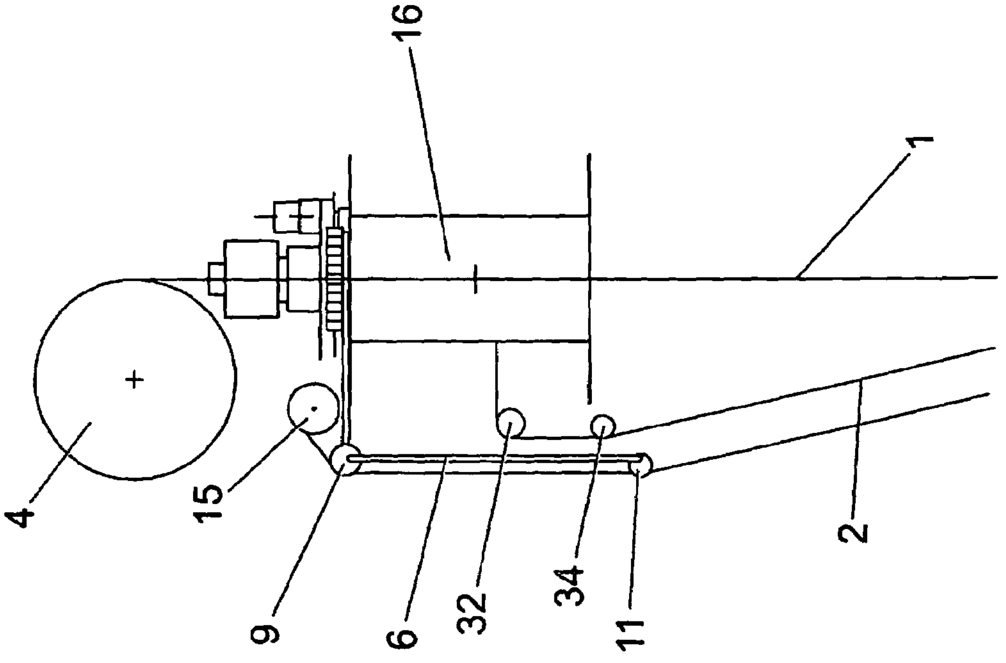
FIG. 7 is a cross-section view of an embodiment of FIG. 5.

FIG. 7 shows an embodiment similar to that of FIG. 4, but having the rope drum 15 positioned around the hoist rope 1, with its axis aligned with the hoist rope's axis. The service cable 2 extends over a rotatable arm (not shown) and over guides 32, 34, which are typically rollers or sheaves, as shown and described above for the FIG. 8 embodiment.

Figure 9:
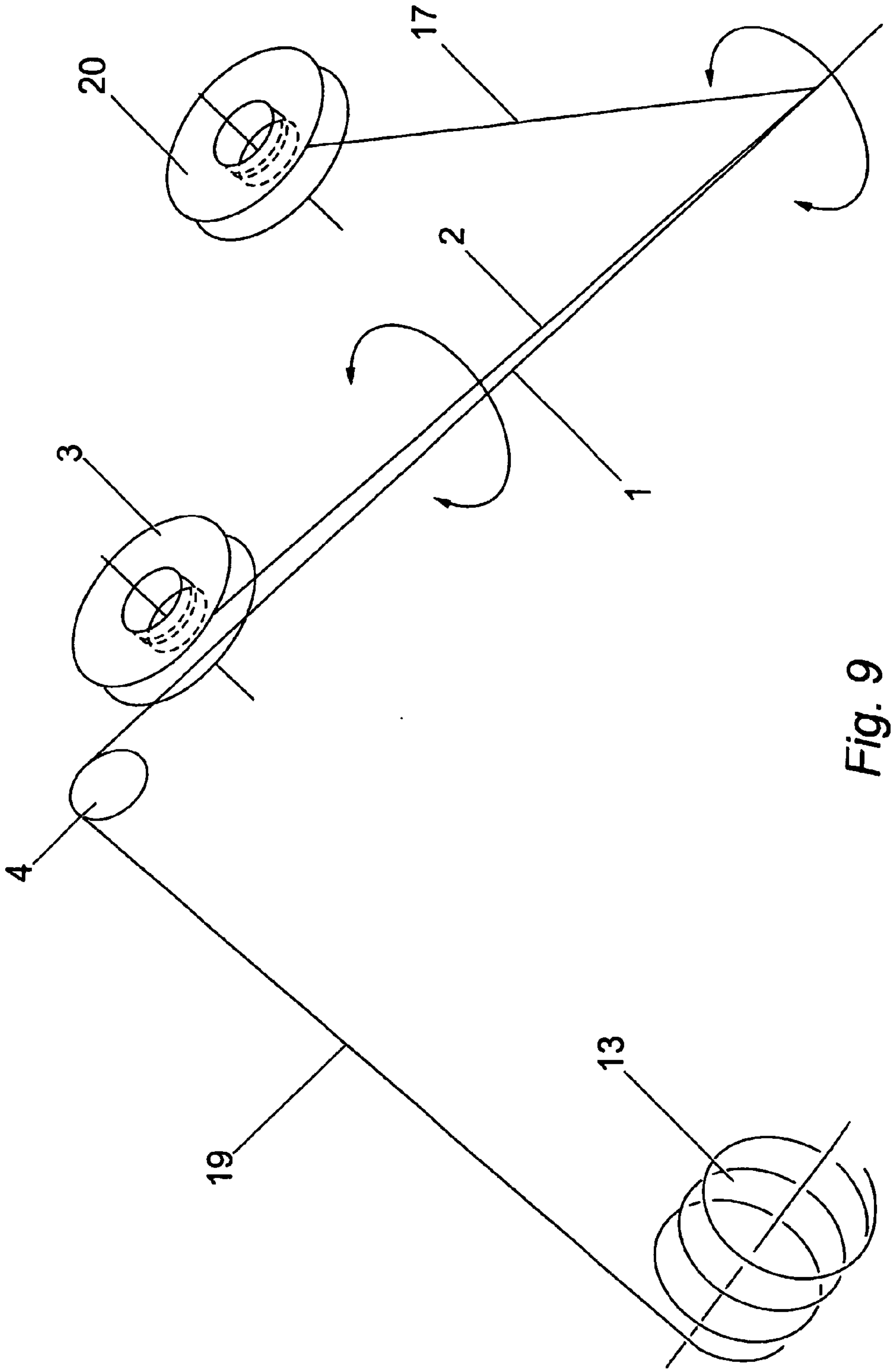
FIG. 9 is a schematic perspective view of FIG. 1, adapted for towing rather than lifting.

FIG. 9 illustrates the example of FIG. 1 modified for use in a marine towing application, for example in paying out, towing and recovering a sensor array such as a sonar sensor or seismographic surveying sensor, the sensor array being towed underwater or on the surface. The service cable drum 3 is hinged to the main structure of the towing vessel (not shown) and can be tilted to a desired towing angle by hydraulic or other mechanisms.

Other modifications may be made within the scope of the invention. For example, the positions of the hoist rope 1 and the service cable 2 could be reversed so that the hoist rope 1 is on a drum and the cable 2 is fed from a winch, to wind the hoist rope 1 around the service cable 2. When tension is put on the hoist rope 1, the hoist rope 1 straightens and the service cable 2 becomes wound around the hoist rope 1 in any case.

More service cable drums could be provided: in the embodiment of FIG. 1, further service cable drums could be provided rotatably mounted around the hoist rope 1; in the embodiment of FIG. 5 there could be further arms extending radially outward of the hoist rope 1 axis, each with a respective cable sheave.

Further rollers and/or guide sheaves could be used to conveniently position the cable relative to the rope, e.g. to deflect one away from the axis of the other, or to pass the cable around the lip of an arm to align the cable with the rope.

The securing member 17 is preferably wrapped around the hoist rope 1 in the opposite direction to the wrapping of the outer or only service cable 2, but this is not essential, and the securing member could be wrapped onto the rope and cable at a different pitch to the cable. Tape could also be wrapped around the entwined cable/ropes, either at intervals or in a long continuous length. To unwind the cable/ropes, the tape may be unwrapped or cut therefrom.

The invention claimed is:

1. Apparatus for use in handling a load comprising a load-bearing rope, a mechanism for paying out and recovering the load-bearing rope, a service cable and a service cable holder for holding the service cable, a first wrapping device for rotating one of the service cable and the load-bearing rope around the other as they are payed out to wrap the two together, and to unwrap them from one another as they are recovered, a mechanism for holding and paying out a securing member, and a second wrapping device for wrapping the securing member around the service cable and the load-bearing rope, and to unwrap the securing member from the service cable and load-bearing rope as either of them is recovered, wherein the securing member is wrapped around the rope and service cable in a form selected from the group consisting of a planar strip, a tape and a ribbon.

2. Apparatus as claimed in claim 1, wherein the securing member is resilient.

3. Apparatus as claimed in claim 1, wherein the securing member is tensioned as it is applied to the rope.

4. Apparatus as claimed in claim 1, wherein the first wrapping device rotates a service cable drum in a circular path around the axis of the rope.

5. Apparatus as claimed in claim 1, wherein the service cable is stored on a drum having an axis that is co-axial with the axis of the rope and wherein the service cable wrapping device rotates around the drum to pay out the service cable.

6. Apparatus as claimed in claim 1, wherein the securing member is stored on a securing member drum and wherein the second wrapping device rotates the securing member drum in a circular path around the axis of the rope.

7. Apparatus as claimed in claim 1, wherein the securing member is stored on a drum that has an axis which coincides with the axis of the load-bearing rope, the securing member drum having a central aperture through which the load-bearing rope passes, and wherein the securing member passes over a sheave which is mounted for movement in a circular path around the axis of the load-bearing rope.

8. Apparatus as claimed in claim 1, wherein the second winding device is arranged to discharge the securing member radially outward of the service cable to wind the securing member around the service cable and the load-bearing rope.

9. Apparatus as claimed in claim 1, wherein the securing member comprises an elastic strip with a non-elastic reinforcing member to limit the maximum extension of the securing member.

10. Apparatus as claimed in claim 1, wherein the securing member incorporates an adhesive to hold the securing member to the rope and service cable.

11. Apparatus as claimed in any claim 1, wherein the wrapping devices are arranged to pay out the service cable and/or the securing member close to the axis of the rope.

12. Apparatus as claimed in claim 1, having more than one service cable wrapping device to accommodate respective service cables and to wrap them on to the rope.

13. Apparatus as claimed in claim 1, having guide means to guide at least one selected from the group consisting of the service cable(s), the securing member and the rope, the guide means comprising at least one selected from the group consisting of a roller and a sheave.

14. Apparatus as claimed in claim 13, wherein the guide means comprises a roller cage provided around the circumference of at least one selected from the group consisting of the securing member, the guide means and the rope.

15. A method for use in handling a load, comprising the steps of:

paying out a load-bearing rope;

paying out a service cable;

wrapping one of the rope and the service cable around the other as they are being paid out;

wrapping a securing member around the service cable and load-bearing rope as they are being paid out; and subsequently unwrapping the securing member and service cable from the load-bearing rope as the load-bearing rope is recovered, wherein the securing member is wrapped around the rope and service cable in the form of a planar strip, tape or ribbon.

16. A method as claimed in claim 15, wherein the securing member is wound around the load-bearing rope in the opposite direction to the service cable.

17. A method as claimed in claim 15, wherein the securing member is wrapped around the rope and service cable(s) only at intervals along the rope.

18. A method as claimed in claim 15, wherein the securing member is wrapped continuously around the length of the rope as it is payed out.

19. A method as claimed in claim 15, wherein the securing member is tensioned as it is wound around the rope.

20. A method as claimed in claim 15, wherein tape is applied intermittently on top of the securing member.

21. A method as claimed in claim 15, wherein at least two service cables are entwined with the rope before the securing member is applied.

* * * * *